US007729540B2

(12) United States Patent
Koyama et al.

(10) Patent No.: US 7,729,540 B2
(45) Date of Patent: Jun. 1, 2010

(54) TRANSLATION DEVICE, TRANSLATION PROGRAM, AND TRANSLATION METHOD

(75) Inventors: Toshiya Koyama, Ashigarakami-gun (JP); Teruka Saito, Ashigarakami-gun (JP); Masakazu Tateno, Ashigarakami-gun (JP); Kei Tanaka, Ashigarakami-gun (JP); Takashi Nagao, Ashigarakami-gun (JP); Masayoshi Sakakibara, Ebina (JP); Xinyu Peng, Ebina (JP); Kotaro Nakamura, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1296 days.

(21) Appl. No.: 11/224,050

(22) Filed: Sep. 13, 2005

(65) Prior Publication Data

US 2006/0204094 A1 Sep. 14, 2006

(30) Foreign Application Priority Data

Mar. 9, 2005 (JP) ............................ 2005-065960

(51) Int. Cl.
*G06K 9/34* (2006.01)
*G06K 9/32* (2006.01)
*G06K 15/00* (2006.01)
*H04N 1/40* (2006.01)
*G06T 5/00* (2006.01)
*G06F 17/28* (2006.01)

(52) U.S. Cl. ....................... 382/181; 382/176; 382/300; 358/2.1; 358/462; 358/3.27; 715/236; 704/2

(58) Field of Classification Search ................ 382/173, 382/176, 180, 162, 276, 293, 298, 299, 300, 382/181; 358/1.9, 1.16, 1.11, 1.18, 462, 358/404, 450, 2.1, 1.2, 3.27, 1.15, 1.17, 1.13; 715/219, 236; 345/443; 716/11; 704/2
See application file for complete search history.

(56) References Cited

U.S. PATENT DOCUMENTS 5,348,558 A * 9/1994 Ito et al. .................... 29/25.01
5,940,583 A * 8/1999 Taira et al. ................. 358/1.15
6,131,082 A * 10/2000 Hargrave et al. ............... 704/7

(Continued)

FOREIGN PATENT DOCUMENTS

JP A 06-162081 6/1994

(Continued)

*Primary Examiner*—Sheela C Chawan
(74) *Attorney, Agent, or Firm*—Oliff & Berridge, PLC

(57) ABSTRACT

A translation device has a translation processing unit that outputs character-area-character data by performing a translation process on the character-area-character data of an input image representing a figure-containing document, and outputting figure-area-character data by performing a translation process on the figure-area-character data of an input image representing a figure-containing document, a figure identification information searching unit that searches figure identification information used to identify a figure contained in a character area of the figure-containing-translation data, a linked page number searching unit that searches a page number in a character area of the figure-containing-translation data, a page number extracting unit that extracts a page number of a page included in figure area of figure identification information, and a page number rewriting unit that rewrites the searched page number linked to the figure identification information to the extracted page number of a page.

6 Claims, 3 Drawing Sheets

U.S. PATENT DOCUMENTS 6,163,623 A * 12/2000 Ohta .......................... 382/176
7,054,029 B1 * 5/2006 Ohta et al. ................. 358/1.18
7,095,513 B2 * 8/2006 Stringham ................. 358/1.13
7,207,005 B2 * 4/2007 Lakritz ....................... 715/201
7,528,986 B2 * 5/2009 Kato ......................... 358/1.18

FOREIGN PATENT DOCUMENTS

JP A-10-116285 5/1998

* cited by examiner

120

| FIGURE NUMBER | ADDRESS OF FIGURE NUMBER | PAGE NUMBER LINKED TO FIGURE NUMBER | ADDRESS OF PAGE NUMBER | PAGE NUMBER OF FIGURE |
|---|---|---|---|---|
| FIGURE 1 | 72 | 2 | 67 | 2 |
| ~ | ~ | ~ | ~ | ~ |
| | | | MISMATCH | |
| FIGURE 7 | 356 | 5 | 350 | 6 |
| | | | REWRITING | |
| ~ | ~ | ~ | ~ | ~ |

TRANSLATION DEVICE, TRANSLATION PROGRAM, AND TRANSLATION METHOD

BACKGROUND OF THE INVENTION

1. Field of the Invention

The present invention relates to a device and to a method for receiving an image containing character area and figure area, and for translating a character portion of a received image to a different, specified, language, and for outputting a figure including the translation in the specified language of the character area.

2. Description of the Related Art

Various types of translation devices and methods have been proposed for receiving an image containing character area and figure area, and for translating a character portion of the image to a different, specified language, and outputting a figure including the translated character portion.

In conventional translation devices, translation of characters in a document is performed, and a number and size of translated characters is compared with those of the original character area. Then, any necessary adjustments are made to the character area of the translated characters. If the resulting character area cannot be fitted along with the figure area in the same page as used in the corresponding document, due to a change in text length as a result of translation, the figure area is moved to a different page. If a figure area is moved to a different page, as described, an incorrect reference to the figure may result. For example, if a description "FIG. 2 in page 5" is included in a character area of an original document, and the figure area is moved to a different page upon translation, and FIG. 2 is consequently included in a page which is not page 5, the reference to the figure will be erroneous.

SUMMARY OF THE INVENTION

The present invention provides a translation device including: a layout analysis unit that performs a layout analysis on an input image representing a figure-containing document and identifying a character area and a figure area in the input image; a character recognition unit that outputs character-area-character data by performing a character recognition process on an image of the character area of the input image, and outputting figure-area-character data by performing a character recognition process on characters existing in the image of the figure area of the input image; a translation processing unit that outputs character-area-character data by performing a translation process on the character-area-character data, and outputting figure-area-character data by performing a translation process on the figure-area-character data; a layout configuration processing unit that generates figure-containing-translation data of one or more than one page, the data including in a character area character-area-character data and in a figure area both figure-area-character data and an image excluding figure-area-character data from a figure area of the input image; a figure identification information searching unit that searches figure identification information used to identify a figure contained in a character area of the figure-containing-translation data; a linked page number searching unit that searches a page number linked to figure identification information identified by the figure identification information searching unit in a character area of the figure-containing-translation data; a page number extracting unit that extracts a page number of a page included in figure area of figure identification information identified by the figure identification information searching unit in the figure-containing-translation data; and a page number rewriting unit that rewrites a page number linked to figure identification information identified by the linked page number searching unit in a character area of the figure-containing-translation data to a page number of a page included in a figure area of the figure identification information extracted by the page number extracting unit.

BRIEF DESCRIPTION OF THE DRAWINGS

Embodiments of the present invention will now be described in detail with reference to the following figures, wherein.

DETAILED DESCRIPTION OF THE INVENTION

An embodiment of the present invention will now be described in detail with reference to the figures.

First Embodiment

Figure 1:
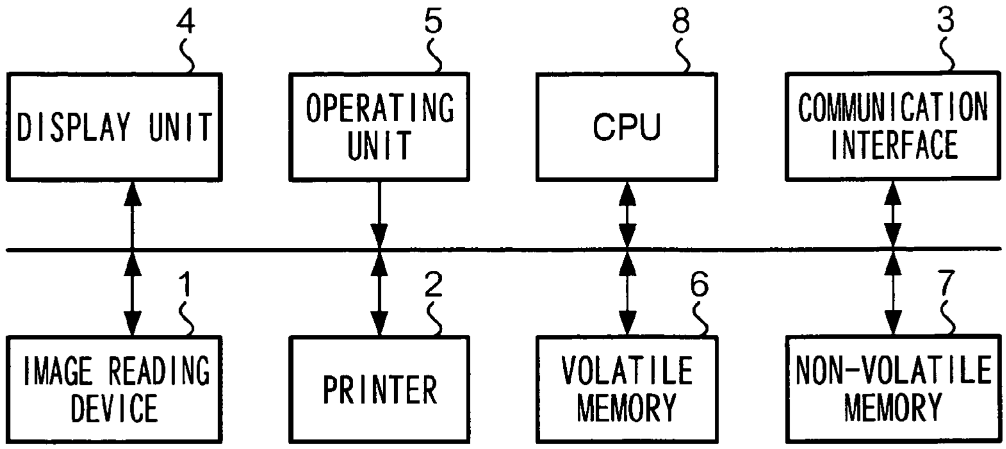
FIG. 1 is a block diagram showing a configuration of a translation device according to a first embodiment of the present invention.

FIG. 1 is a block diagram showing a basic configuration of a translation device according to the first embodiment of the present invention. The translation device is configured as a multifunction device, and is equipped with a scanning function, a copy function, a printing function, and a facsimile function. The translation device also includes an image reading unit 1 having an ADF (Automatic Document Feeder), a printer 2, a communication interface 3, a display 4, an operating unit 5, a volatile memory 6, a non-volatile memory 7, and a CPU 8 for controlling each of the stated functions of the translation device. Thus, CPU 8 enables the translation device to realize various functions of the multifunction device, such functions including: a copy function, wherein an image read by the image reading unit 1 is printed by the printer 2; and a facsimile function, wherein the read image is sent to a facsimile via the communication interface 3, and a network.

Figure 2:
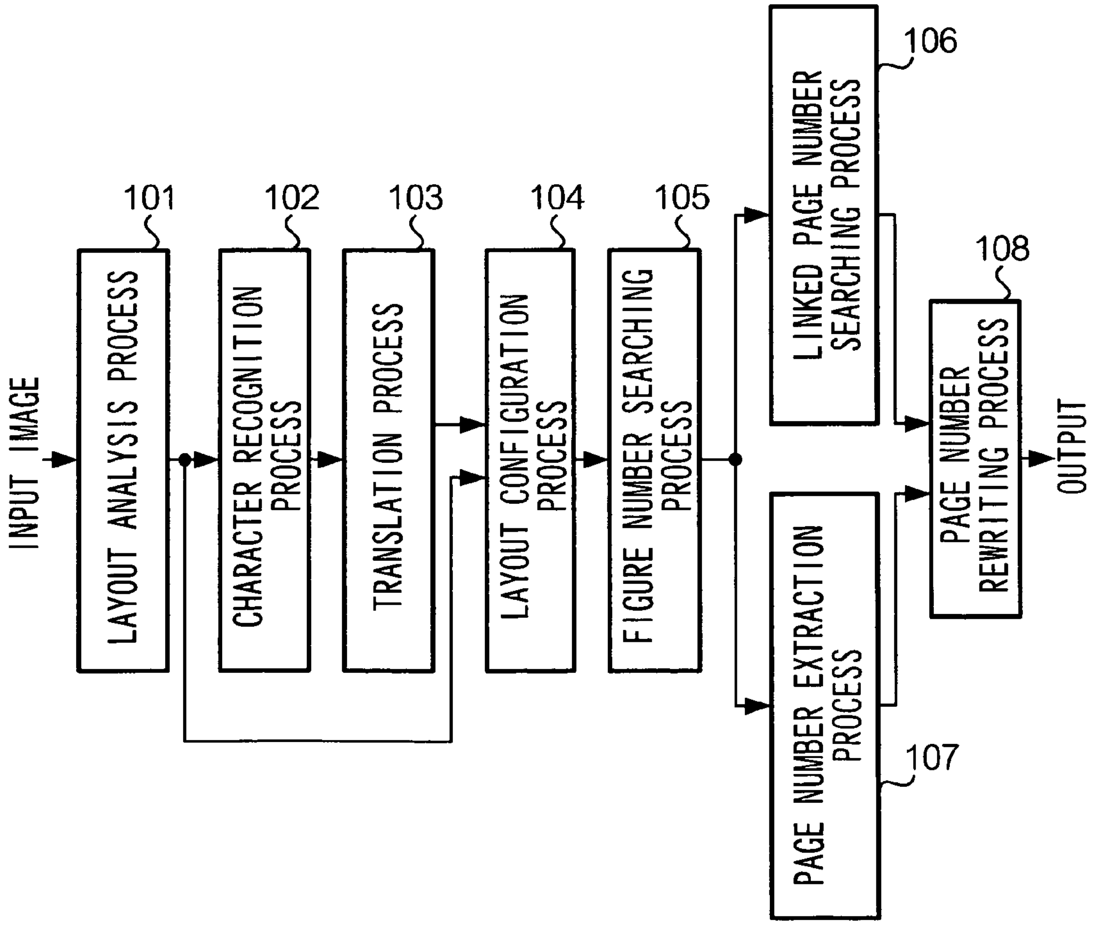
FIG. 2 is a flowchart showing a process carried out as a result of running a figure-containing-document translation program, according to the first embodiment of the present invention.

The non-volatile memory 7 stores a program for causing the CPU 8 to cause the multi-function translation device to carry out desired functions, and also a program (for carrying out a process of a method) which is unique to the present embodiment. The program is a figure-containing-document translation program for translating character strings included in an image read from a source that is external to the translation device, to character strings in a different specified language, and for generating figure-containing-translation data. The process carried out by the figure-containing-document translation program is illustrated in the flowchart of FIG. 2. A detailed explanation of the process illustrated in the flow chart of FIG. 2 will be provided in the explanation of the operation of the present embodiment.

The translation device according to the present embodiment can be configured to perform translation of a document containing a figure in a manner, for example, as follows.

a. An image of a document containing character strings in a particular language is read by the image reading device 1 and is stored in the volatile memory 6. Then, a processing of the image is carried out by using the program of the present embodiment. The figure-containing-document translation program acquired as a result of the procedure outlined above, is printed by the printer 2. Alternatively, by using the communication interface 3, figure-containing-translation data acquired as a result of the process using a figure-containing-document translation program is sent by facsimile or E-mail to a user requiring a translation.

b. An image of a document containing character strings in a particular language is received via the communication interface 3 and stored in the volatile memory 6. Then, a processing of the image is carried out by using the program of the present embodiment. Figure-containing-translation data which is acquired as a result of the procedure outlined above, is printed by the printer 2. Alternatively, by using the communication interface 3, the figure-containing-translation data acquired as a result of the process using a figure-containing-document translation program is sent by facsimile or E-mail to a user requiring a translation.

In the present embodiment, the non-volatile memory 7 stores a control program for transmitting an image which is input information of a figure-containing-document translation program and figure-containing-translation data which is output information of a document containing a figure. An information type to be transmitted by a control program is determined by a command made by the operating unit 5 or via the communication interface 3.

Next, various operations of the present invention will be explained. An input image of one or more pages is read for input by the image reading unit or is input via the communication interface 3, and is stored in the volatile memory 6. The CPU 8 runs a figure-containing-document translation program which causes the process to be performed as illustrated in the flow chart of FIG. 2, which will be described later. In a layout analysis process 101 which is the initial process of the figure-containing-document translation program, the CPU 8 analysis an input image of each page stored in the volatile memory 6, determines character area and figure area of the image, and generates, in the work area of the volatile memory 6, figure-containing-translation data including the character area and the figure area. At this phase, no data is included in the character area and the figure area of the figure-containing-translation data. Also, for each page of the original input image the figure-containing-translation data has a footer storing a corresponding page number. When the page numbers in the figure-containing-translation data have to be changed or the number of pages varies, the page numbers of the footers of the corresponding pages are updated accordingly.

The CPU 8 then performs a character recognition process 102 and a translation process 103 sequentially. In the character recognition process 102, character-area-character data is generated by performing character recognition on the image of a character area of each page stored in the volatile memory 6, and figure-area-character data is generated by performing character recognition on the image of characters existing in the figure area of each input image. Both data are stored in the volatile memory 6. The character-area-character data includes information indicating the type of each recognized character, such as whether a character is written in Japanese or Roman letters, or the character is numeric and format information relating to character size, paragraph spacing, blank spaces and the like. The figure-area-character data includes information indicating the type, location, and size of characters in the figure area.

In the translation process 103, a translation process is performed on the character-area-character data generated in the manner described above to generate character-area translation data; and, the translation process is performed on the figure-area-character data to generate figure-area-character data. Both data are stored in the volatile memory 6. The character-area-translation data includes information indicating the type of each character forming a translation, and format information taken from the character-area-character data. The figure-area-translation data includes information indicating the type of each character forming a translation and information indicating the location and the size of the characters taken from the figure-area-character data. The language of character strings in the input image and the language of the translation are specified by a command given through the operation unit 5 and the communication interface 3.

The CPU 8 then performs a layout configuration process 104. In the layout configuration process 104, image data of a figure in the figure area of the input image is stored in a figure area of figure-containing-translation data corresponding to the figure area. In the layout configuration process 104, character area translation data, acquired from the character area of the input image as a result of the character recognition process 102 and the translation process 103, is stored in a character area of figure-containing-translation data corresponding to the character area of the input image. Also, in the layout configuration process 104, figure area translation data acquired from the figure area of the input image as a result of the character recognition process 102 and the translation process 103 is stored in a figure area of figure-containing-translation data corresponding to the figure area. When the figure area translation data is stored, information indicating the location and size of a character in the figure-containing-translation data is stored, an image existing in the area where the character is to be included is deleted; figure area translation data is stored in a blank area created as a result of deletion.

The number of characters included in a document translated by the translation process 103 generally changes as a result of the translation process. Therefore, the amount of data included in character-area translation data acquired as a result of the character recognition process 102 and the translation process 103, does not necessarily fit in an area equal in size to the original character area. Therefore, during the process of storing character-area translation data in a character area of figure-containing-translation data at the layout configuration process 104, a character area is enlarged so that none of the character-area translation data will be excluded from the character area, or a character area is reduced to avoid creating a large blank space in the character area. When a figure area becomes an obstruction during the scaling of the character area, the figure area is moved to the subsequent page, and the character area is then scaled. As explained, the contents in each page of figure-containing-translation data acquired by the layout configuration process 104 do not necessarily correspond to the contents in each page of the originally input image. As a result, a case may frequently occur, where a figure contained in a certain page of an input image is moved to a different page of figure-containing-translation data. The process performed subsequent to a figure number searching process 105 in FIG. 2, is a process executed by the CPU 8 to address this problem.

Figures 3, 5:
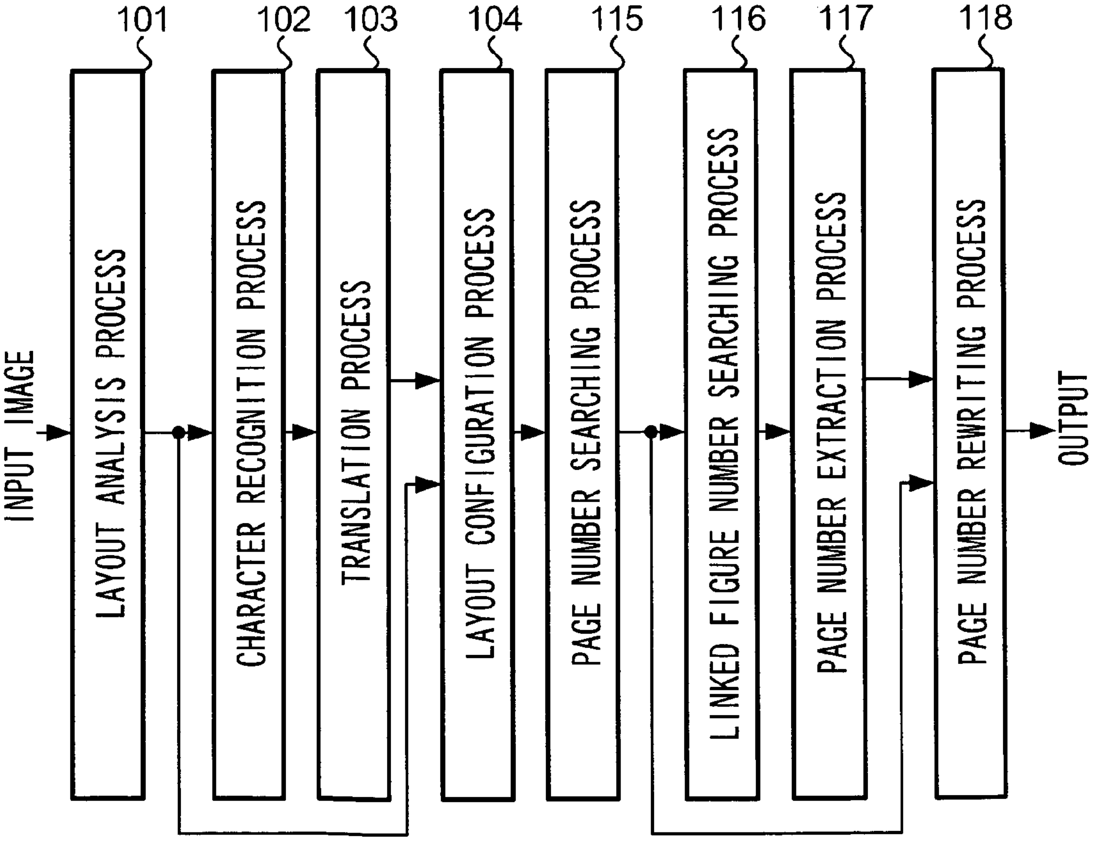
FIG. 3 is a diagram showing a substitution work table of the first embodiment.
FIG. 5 is a flowchart showing a process carried out as a result of running a figure-containing-document translation program, according to the second embodiment of the present invention.

In the figure number searching process 105, a linked page number searching process 106, a page number extraction process 107 and a substitution work table 120 as shown in FIG. 3 is prepared in the volatile memory 6 by the following process. In the figure number searching process 105, a figure number is searched from the data of character area in figure-containing-translation data, and the figure number identified as a result of searching and an address of the number in the figure-containing-translation data are stored in the corresponding area of the substitution work table 120. It is to be noted that an address is a sequential number determined by counting from a first letter on a page, given to translation data of each character in a character area of figure-containing-translation data.

In the linked page number searching process 106, on the basis of an address of a figure number, the region around the figure number identified in the figure number searching process 105 is searched to determine whether a page number linked to the figure number exists in a character area of figure-containing-translation data. When a page number linked to the figure number exists within the searched region, the page number and its address are stored in a corresponding area of the substitution work table 120. In the page number extraction process 107, a figure area of figure-containing-translation data is searched for figure number stored in the substitution work table 120. Then, a number of a page including a figure number identified as a result of the search is extracted from, for example, a footer region of the page of figure-containing-translation data; the extracted page number is then stored in the corresponding area of the substitution work table 120. As a result of the above process, the substitution work table 120 is completed.

In a page number rewriting process 108, the substitution work table 120 is referred to and each wrong page number existing in the character area of figure-containing-translation data is rewritten to a suitable page number. More specifically, in the page number rewriting process 108, each pair of a page number linked to a figure and a number of a page including the figure are sequentially compared. When the two pairs are not in agreement, as shown in the corresponding part of "FIG. 7" in FIG. 3, the address (in this example, "350") of the page number linked to the figure number (in this example, "5") in the character area of figure-containing-translation data is rewritten to the number of the page including the figure (in this example, "6").

As described in the foregoing, figure-containing-translation data described with a page number referring to a figure in a character area is acquired in the work area of the volatile memory 6.

The figure-containing-translation data is printed on a recording paper as an image by the printer 2, or the data is sent via the communication interface 3 to an external user requesting the translation result.

Figures 4A, 4B, 4C:
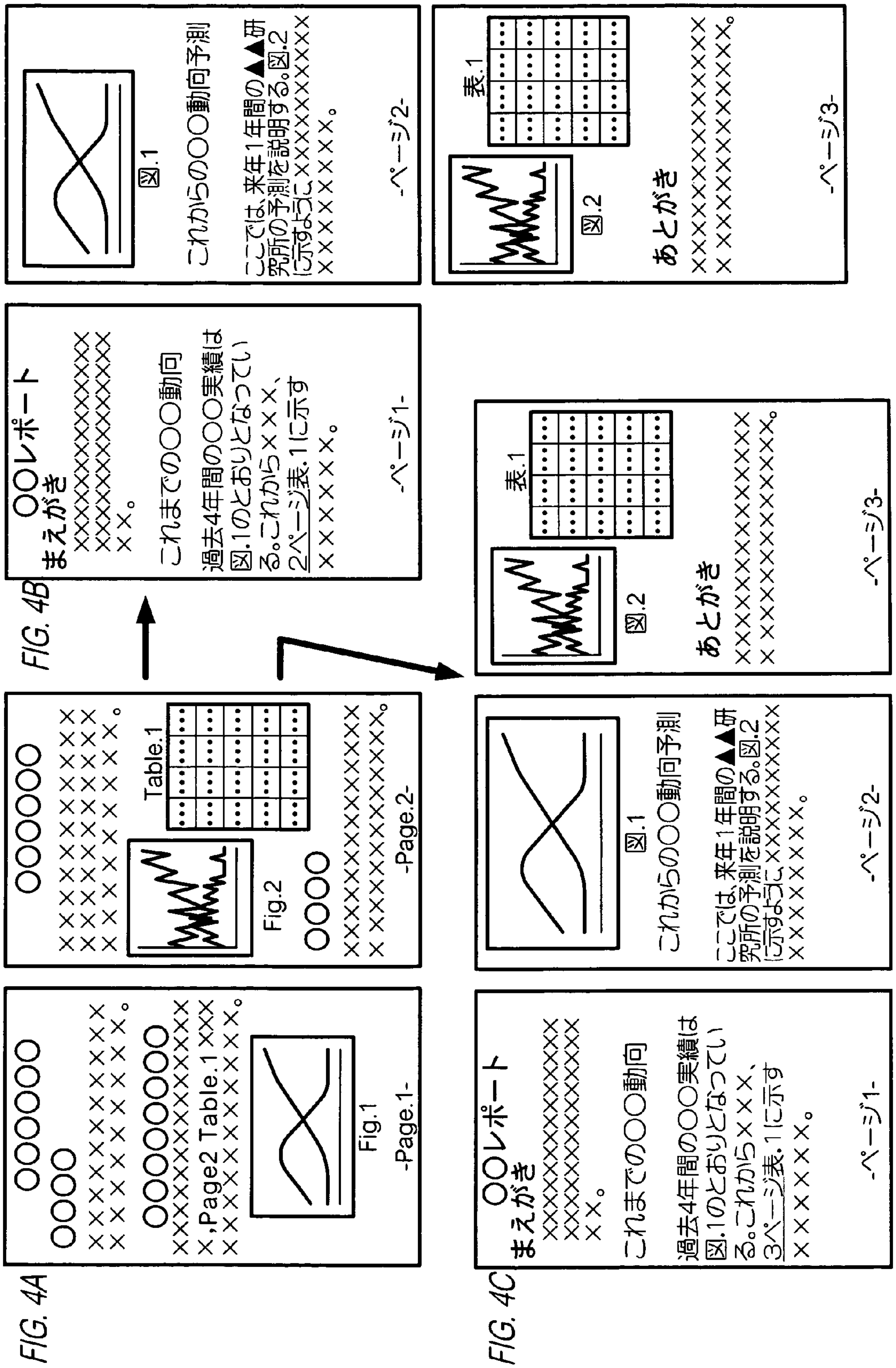
FIGS. 4A-4C are diagrams comparing effects of the first embodiment of the present invention with effects of a related art.

FIGS. 4A-4C are diagrams explaining an effect of the present embodiment in comparison with a related art. In the example shown in FIG. 4A, an input image of a figure-containing document described in a foreign language is stored in the volatile memory 6; the character strings of the input image are then translated into Japanese.

According to the related art, as shown in FIG. 4B, even in a case where 表1 (English translation "Table 1") is moved from "Page 2" (refer to FIG. 4A) to "Page 3" as a result of scaling of a character area, the description relating to the changes in the character area remains unchanged; namely, in the character area, it is still stated that 表1 (English translation "Table 1") appears on ページ2 (English translation "Page 2"), which corresponds to the description before translation, even though 表1 (English translation "Table 1") no longer appears on ページ2 (English translation "Page 2"). Conversely, in the present embodiment, as shown in FIG. 4C, the description in the character area relating to the page where "Table 1" is included, is rewritten to the correct description; namely, ページ3 (English translation "Page 3). Therefore, a figure-containing translation is improved so that the text of a translation includes accurate references to figures.

Second Embodiment

FIG. 5 is a flowchart showing the process of a figure-containing-document translation program, according to the second embodiment of the present invention. In the figure-containing-document translation program, the processes from the layout analysis process 101 to the layout configuration process 104 are the same as in the first embodiment. Therefore, an explanation of those processes will not be repeated.

In the first embodiment, when a figure number in a character area is searched, a page number linked to the figure number is checked and an examination is made to determine whether it is necessary to rewrite the page number. Conversely, in the present embodiment, a page number searching process 115 is performed, wherein a page number in the character area of figure-containing-translation data is searched. Then, a linked figure number searching process 116 is performed, wherein a figure number linked to the page number, identified as a result of the page number searching process 115, is searched for in the character area. Then, by performing a page number extraction process 117, a figure including the figure number found as a result of the linked figure number searching process 116 is searched for in the figure area of the figure-containing-translation data, to determine a number of a page in which the figure is included. In a page number rerewriting process 118, a comparison is made between a page number for which a figure number is identified as a result of the linked figure number searching process 116, from among the page numbers acquired as a result of the page number searching process 115, and the page number of a page where the figure having the figure number is included, the page number having been acquired as a result of the page number extraction process 117. When the page numbers are not in agreement, the page number acquired by the process 116 is rewritten to the page number acquired by the process 117.

The present embodiment provides the same results as the first embodiment.

Other Embodiments

The first embodiment and second embodiment have been explained; the present invention also encompasses various embodiments, such as described below.

(1) In the embodiments described above, a figure number is used as figure identification information for identifying a figure; a title or a headline of a figure may also be used as figure identification information.

(2) In the embodiments described above, translation data is stored as character data in a character area and image data in a figure area and figure-containing-translation data having both character data and image data is configured; in another configuration, all translation data may be formed as image data as a result of mapping to a character area and a figure area.

The present invention provides a translation device including: a layout analysis unit that performs a layout analysis on an input image representing a figure-containing document and identifying a character area and a figure area in the input image; a character recognition unit that outputs character-area-character data by performing a character recognition process on an image of the character area of the input image, and outputting figure-area-character data by performing a character recognition process on characters existing in the image of the figure area of the input image; a translation processing unit that outputs character-area-character data by performing a translation process on the character-area-character data, and outputting figure-area-character data by performing a translation process on the figure-area-character data; a layout configuration processing unit that generates figure-containing-translation data of one or more than one page, the data including in a character area character-area-character data and in a figure area both figure-area-character data and an image excluding figure-area-character data from a figure area of the input image; a figure identification information searching unit that searches figure identification information used to identify a figure contained in a character area of the figure-containing-translation data; a linked page number searching unit that searches a page number linked to figure identification information identified by the figure identification information searching unit in a character area of the figure-containing-translation data; a page number extracting unit that extracts a page number of a page included in figure area of figure identification information identified by the figure identification information searching unit in the figure-containing-translation data; and a page number rewriting unit that rewrites a page number linked to figure identification information identified by the linked page number searching unit in a character area of the figure-containing-translation data to a page number of a page included in a figure area of the figure identification information extracted by the page number extracting unit.

The present invention provides a translation device including: a layout analysis unit that performs a layout analysis on an input image representing a figure-containing document and identifying a character area and a figure area in the input image; a character recognition unit that outputs character-area-character data by performing a character recognition process on an image of the character area of the input image, and outputting figure-area-character data by performing a character recognition process on characters existing in the image of the figure area of the input image; a translation processing unit that outputs character-area-character data by performing a translation process on the character-area-character data, and outputting figure-area-character data by performing a translation process on the figure-area-character data; a layout configuration processing unit that generates figure-containing-translation data of one or more than one page, the data including in a character area character-area-character data and in a figure area both figure-area-character data and an image excluding figure-area-character data from a figure area of the input image; an page number searching unit that searches a page number contained in a character area of the figure-containing-translation data; a linked figure identification information searching unit that searches figure identification information used to identify a figure, the information linked to the page number identified by the page number searching unit in a character area of the figure-containing-translation data; a page number extracting unit that extracts a page number of a page included in figure area of figure identification information identified by the linked figure identification information searching unit in the figure-containing-translation data; and a page number rewriting unit that rewrites a page number linked to the figure identification information identified by the linked figure identification information searching unit among the page numbers identified by the page number searching unit to a page number of a page included in a figure area of the figure identification information extracted by the page number extracting unit.

With this translation device, in a case that, as a result of a difference in number or size of translated characters of a character area, a figure area is placed on a page which is different to that of the related character area, and the page reference for a figure in the figure area changes, errors in descriptions relating to figures in character areas are corrected.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments, and with the various modifications as are suited to the particular use contemplated. It is intended that the scope of the invention be defined by the following claims and their equivalents.

The entire disclosure of Japanese Patent Application No. 2005-65960 filed on Mar. 9, 2005 including specification, claims, drawings and abstract is incorporated herein by reference in its entirety.

What is claimed is:

1. A translation device comprising:

a layout analysis unit that performs a layout analysis on an input image representing a figure-containing document and identifying a character area and a figure area in the input image;

a character recognition unit that outputs character-area-character data by performing a character recognition process on an image of the character area of the input image, and outputting figure-area-character data by performing a character recognition process on characters existing in an image of the figure area of the input image;

a translation processing unit that outputs character-area-character data by performing a translation process on the character-area-character data, and outputting figure-area-character data by performing a translation process on the figure-area-character data;

a layout configuration processing unit that generates figure-containing-translation data of one or more than one page, the data including in a character area character-area-character data and in a figure area both figure-area-character data and an image excluding figure-area-character data from a figure area of the input image;

a figure identification information searching unit that searches figure identification information used to identify a figure contained in a character area of the figure-containing-translation data;

a linked page number searching unit that searches a page number linked to figure identification information identified by the figure identification information searching unit in a character area of the figure-containing-translation data;

a page number extracting unit that extracts a page number of a page included in a figure area of figure identification information identified by the figure identification information searching unit in the figure-containing-translation data; and a page number rewriting unit that rewrites a page number linked to figure identification information identified by the linked page number searching unit in a character area of the figure-containing-translation data to the page number of a page included in a figure area of the figure identification information extracted by the page number extracting unit.

2. A translation device comprising:

a layout analysis unit that performs a layout analysis on an input image representing a figure-containing document and identifying a character area and a figure area in the input image;

a character recognition unit that outputs character-area-character data by performing a character recognition process on an image of the character area of the input image, and outputting figure-area-character data by performing a character recognition process on characters existing in the image of the figure area of the input image;

a translation processing unit that outputs character-area-character data by performing a translation process on the character-area-character data, and outputting figure-area-character data by performing a translation process on the figure-area-character data;

a layout configuration processing unit that generates figure-containing-translation data of one or more than one page, the data including in a character area character-area-character data and in a figure area both figure-area-character data and an image excluding figure-area-character data from a figure area of the input image;

an page number searching unit that searches a page number contained in a character area of the figure-containing-translation data;

a linked figure identification information searching unit that searches figure identification information used to identify a figure, the information linked to the page number identified by the page number searching unit in a character area of the figure-containing-translation data;

a page number extracting unit that extracts a page number of a page included in figure area of figure identification information identified by the linked figure identification information searching unit in the figure-containing-translation data; and a page number rewriting unit that rewrites a page number linked to the figure identification information identified by the linked figure identification information searching unit among the page numbers identified by the page number searching unit to a page number of a page included in a figure area of the figure identification information extracted by the page number extracting unit.

3. A storage medium readable by a computer, the storage medium storing a program of instructions executable by the computer to perform a function comprising:

a layout analysis unit that performs a layout analysis on an input image representing a figure-containing document and identifying a character area and a figure area in the input image;

a character recognition unit that outputs character-area-character data by performing a character recognition process on an image of the character area of the input image, and outputting figure-area-character data by performing a character recognition process on characters existing in the image of the figure area of the input image;

a translation processing unit that outputs character-area-character data by performing a translation process on the character-area-character data, and outputting figure-area-character data by performing a translation process on the figure-area-character data;

a layout configuration processing unit that generates figure-containing-translation data of one or more than one page, the data including in a character area character-area-character data and in a figure area both figure-area-character data and an image excluding figure-area-character data from a figure area of the input image;

a figure identification information searching unit that searches figure identification information used to identify a figure contained in a character area of the figure-containing-translation data;

a linked page number searching unit that searches a page number linked to figure identification information identified by the figure identification information searching unit in a character area of the figure-containing-translation data;

a page number extracting unit that extracts a page number of a page included in figure area of figure identification information identified by the figure identification information searching unit in the figure-containing-translation data; and a page number rewriting unit that rewrites a page number linked to figure identification information identified by the linked page number searching unit in a character area of the figure-containing-translation data to a page number of a page included in a figure area of the figure identification information extracted by the page number extracting unit.

4. A storage medium readable by a computer, the storage medium storing a program of instructions executable by the computer to perform a function comprising:

a layout analysis unit that performs a layout analysis on an input image representing a figure-containing document and identifying a character area and a figure area in the input image;

a character recognition unit that outputs character-area-character data by performing a character recognition process on an image of the character area of the input image, and outputting figure-area-character data by performing a character recognition process on characters existing in the image of the figure area of the input image;

a translation processing unit that outputs character-area-character data by performing a translation process on the character-area-character data, and outputting figure-area-character data by performing a translation process on the figure-area-character data;

a layout configuration processing unit that generates figure-containing-translation data of one or more than one page, the data including in a character area character-area-character data and in a figure area both figure-area-character data and an image excluding figure-area-character data from a figure area of the input image;

an page number searching unit that searches a page number contained in a character area of the figure-containing-translation data;

a linked figure identification information searching unit that searches figure identification information used to identify a figure, the information linked to the page number identified by the page number searching unit in a character area of the figure-containing-translation data;

a page number extracting unit that extracts a page number of a page included in figure area of figure identification information identified by the linked figure identification information searching unit in the figure-containing-translation data; and a page number rewriting unit that rewrites a page number linked to the figure identification information identified by the linked figure identification information searching unit among the page numbers identified by the page number searching unit to a page number of a page included in a figure area of the figure identification information extracted by the page number extracting unit.

5. A translation method comprising the steps of:

performing a layout analysis on an input image representing a figure-containing document and identifying a character area and a figure area in the input image;

outputting character-area-character data by performing a character recognition process on an image of the character area of the input image, and outputting figure-area-character data by performing a character recognition process on characters existing in the image of the figure area of the input image;

outputting character-area-character data by performing a translation process on the character-area-character data, and outputting figure-area-character data by performing a translation process on the figure-area-character data;

generating figure-containing-translation data of one or more than one page, the data including in a character area character-area-character data and in a figure area both figure-area-character data and an image excluding figure-area-character data from a figure area of the input image;

searching figure identification information used to identify a figure contained in a character area of the figure-containing-translation data;

searching a page number linked to figure identification information identified in the figure identification information searching step in a character area of the figure-containing-translation data;

extracting a page number of a page included in figure area of figure identification information identified in the figure identification information searching step in the figure-containing-translation data; and rewriting a page number linked to figure identification information identified in the linked page number searching step in a character area of the figure-containing-translation data to a page number of a page included in a figure area of the figure identification information extracted in the page number extracting step.

6. A translation method comprising the steps of:

performing a layout analysis on an input image representing a figure-containing document and identifying a character area and a figure area in the input image;

outputting character-area-character data by performing a character recognition process on an image of the character area of the input image, and outputting figure-area-character data by performing a character recognition process on characters existing in the image of the figure area of the input image;

outputting character-area-character data by performing a translation process on the character-area-character data, and outputting figure-area-character data by performing a translation process on the figure-area-character data;

generating figure-containing-translation data of one or more than one page, the data including in a character area character-area-character data and in a figure area both figure-area-character data and an image excluding figure-area-character data from a figure area of the input image;

searching a page number contained in a character area of the figure-containing-translation data;

searching figure identification information used to identify a figure, the information linked to the page number identified in the page number searching step in a character area of the figure-containing-translation data;

extracting a page number of a page included in figure area of figure identification information identified in the linked figure identification information searching step in the figure-containing-translation data; and rewriting a page number linked to the figure identification information identified in the linked figure identification information searching step among the page numbers identified in the page number searching step to a page number of a page included in a figure area of the figure identification information extracted in the page number extracting step.

* * * * *